April 5, 1927.  A. M. YOUNG ET AL  1,623,152
RADIO APPARATUS
Filed June 12, 1922
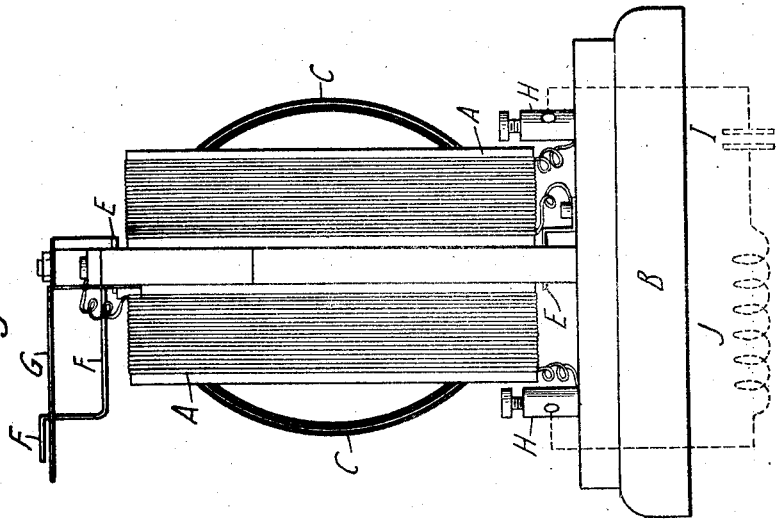
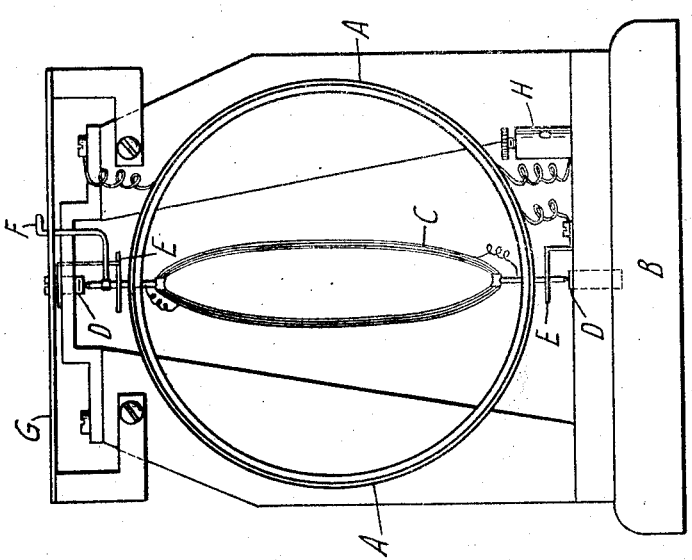
Inventors
ARTHUR M. YOUNG
and NORMAN W. SIMPSON
By their Attorney Patented Apr. 5, 1927.

1,623,152

UNITED STATES PATENT OFFICE.

ARTHUR MILLER YOUNG, OF BRENTWOOD, AND NORMAN WOOLLARD SIMPSON, OF BOLTON, ENGLAND, ASSIGNORS TO RADIO CORPORATION OF AMERICA, A CORPORATION OF DELAWARE.

RADIO APPARATUS.

Application filed June 12, 1922, Serial No. 567,599, and in Great Britain June 18, 1921.

This invention relates to means for indicating the period of oscillations or for controlling electrical oscillations or doing both simultaneously, and its primary object is to provide means for indicating the period of oscillations generated at a wireless transmitting station, so that the engineer in charge may without manipulating any instrument be able to see at a glance whether the wave length emitted is normal or by how much it differs from normal.

According to this invention we construct a variometer of two coils, one within the other, one of the coils, preferably the inner one, being so mounted that it can set itself relatively to the other, and we connect to the movable coil a light arm which can act as an indicating arm moving over a scale, or as a contact arm to close a circuit or may perform both functions simultaneously.

Preferably the movement of the coil is controlled by two hair springs, one at either end, which act as conductors, connecting the fixed coil to the movable coil, and the two coils are connected in series with a condenser and with any inductance which may be required. The circuit so formed has a natural wave length which varies according to the position of the movable coil.

The invention is illustrated by the accompanying drawing in which Figures 1 and 2 are two elevations at right angles to one another. A is a fixed coil mounted on a stand B, while C is a coil which can turn in bearings D, D, E, E, are hair springs connecting the fixed and movable coils together and putting a torsional control upon the coil C. Fast with the coil C is a light arm F which moves over a scale G. The terminals of the coil A are connected to binding screws H, H, which are connected to a capacity I and an inductance J.

When the instrument is in the neighbourhood of an oscillating circuit the movable coil C takes up a position such that the circuit comprising it is in resonance with the oscillations, and when the wave length of these oscillations varies the coil C alters its position to correspond, provided of course the wave length of the oscillations remains within the range of the instrument. Thus the arm F shows on the scale G the wave length of the oscillations. If the arm F is so arranged that it closes an auxiliary circuit when it reaches a definite position the instrument may be caused to interrupt the generation of oscillations or to perform other useful functions; for instance, it may be combined with a circuit breaker.

Preferably the coil C is initially set by hand at or near the position of resonance, the springs being so biased that they will resist movement in one direction. In this way when the coil is moved at or near the point of resonance an increased current flows through the coils, a greater torque will be applied between the coils and they will move of their own accord into the position at which the torque just balances the spring. Any additional movement throws the circuit out of resonance and the flow of current and torque decreases. Variations of frequency now taking place are clearly indicated on the dial within the limits of the instrument. Of course, the voltage must be sufficient to produce appreciable torque to counterbalance the spring at the resonant point. This is a matter of adjustment and no special conditions need exist in general.

Having described our invention what we claim is:

1. An instrument adapted to operate in circuit with a capacity for indicating the period of electrical oscillations, comprising the combination of two inductance coils, one within the other, one being mounted for self adjusting rotation so that it can set itself relatively to the other so that the circuit is in resonance with the oscillations, and an arm actuated by the movable coil.

2. A system for indicating the frequency of electrical oscillations comprising a circuit containing a variable inductance and a capacity, said inductance comprising two inductance coils, one within the other mounted for self adjusting relative rotation to vary the inductance and place the circuit in resonance with the oscillations and means actuated by said relative rotation for indicating or controlling the frequency of said oscillations.

3. Apparatus for indicating the frequency of electrical oscillations comprising a tuning element for an oscillation circuit consisting of two cooperative inductance coils, one within the other, and mounted for self adjusting relative rotation for tuning the circuit to the frequency of oscillations.

4. A system for indicating the frequency of high frequency oscillations comprising a circuit containing a variable inductance and capacity, said inductance comprising two relatively rotatable coils mounted one within the other for self adjusting relative rotation for varying the inductance in accordance with the angular relation therebetween in response to the frequency of the oscillations to tune the circuit to said oscillations.

5. In combination in a circuit, a source of energy of radio-frequency, a stationary coil, another coil rotatable within the stationary coil for changing the inductance of a circuit of the coils, the circuit being so arranged that the coils will move relatively to each other against a bias to indicate the frequency of the source.

6. In combination in a circuit, a source of energy of definite frequency and a condenser, a stationary coil, another coil rotatable within the stationary coil for changing the inductance of a circuit of the coils, the circuit being so arranged that the coils will move relatively to each other against a bias to adjust their relation to each other at such a point that their circuit will be in resonance to the frequency of the source.

7. In combination in a circuit, a source of energy of definite frequency, a condenser, a stationary coil, another coil rotatable within the stationary coil for changing the inductance of a circuit of the coils, the circuit being so arranged that the coils will move relatively to each other against a bias to adjust their relation to each other at such a point that their circuit will be in resonance to the frequency of the source whereby the frequency is indicated on a suitable scale.

8. In combination in a circuit, a source of current of definite frequency, a stationary coil, another coil rotatable within the stationary coil for changing the inductance of a circuit of the coils, the circuit being so arranged that the coils will move relatively to each other against a bias to adjust their relation to each other at such a point that the current flowing through them from the source will be maximum for the frequency of the source.

9. In combination in a circuit, a source of current of definite frequency, a stationary coil, another coil rotatable within the stationary coil for changing the inductance of a circuit of the coils, the circuit being so arranged that the coils will move relatively to each other against a bias to the position in which the maximum current will flow for the frequency of the source.

10. In combination in a circuit, a source of definite frequency, a capacitance a stationary coil, another coil rotatable within the stationary coil for changing the inductance of a circuit of the coils, the circuit being so arranged that the coils will move relatively to each other to adjust their relation to each other at such a point that their circuit will be in resonance to the frequency of the source.

11. An instrument for measuring frequency having coils in circuit with a condenser, one coil being rotatably mounted one within another whereby variations in torque between the coils and reactance in the circuit are varied by the position of the coils, means for holding the coils in position at the point of maximum torque.

12. An instrument for measuring frequency of a source of alternating voltage having coils in circuit with a condenser, one coil being rotatably mounted one within another whereby variations in torque between the coils and reactance in the circuit are varied by the position of the coils, means for holding the coils in position at the point of maximum torque independent of the voltage whereby the coil will move directly in accordance with the frequency.

ARTHUR MILLER YOUNG.
NORMAN WOOLLARD SIMPSON.